Dec. 27, 1966     F. O. HESS     3,294,511
APPARATUS FOR FORMING GLASS BEADS
Filed April 6, 1959
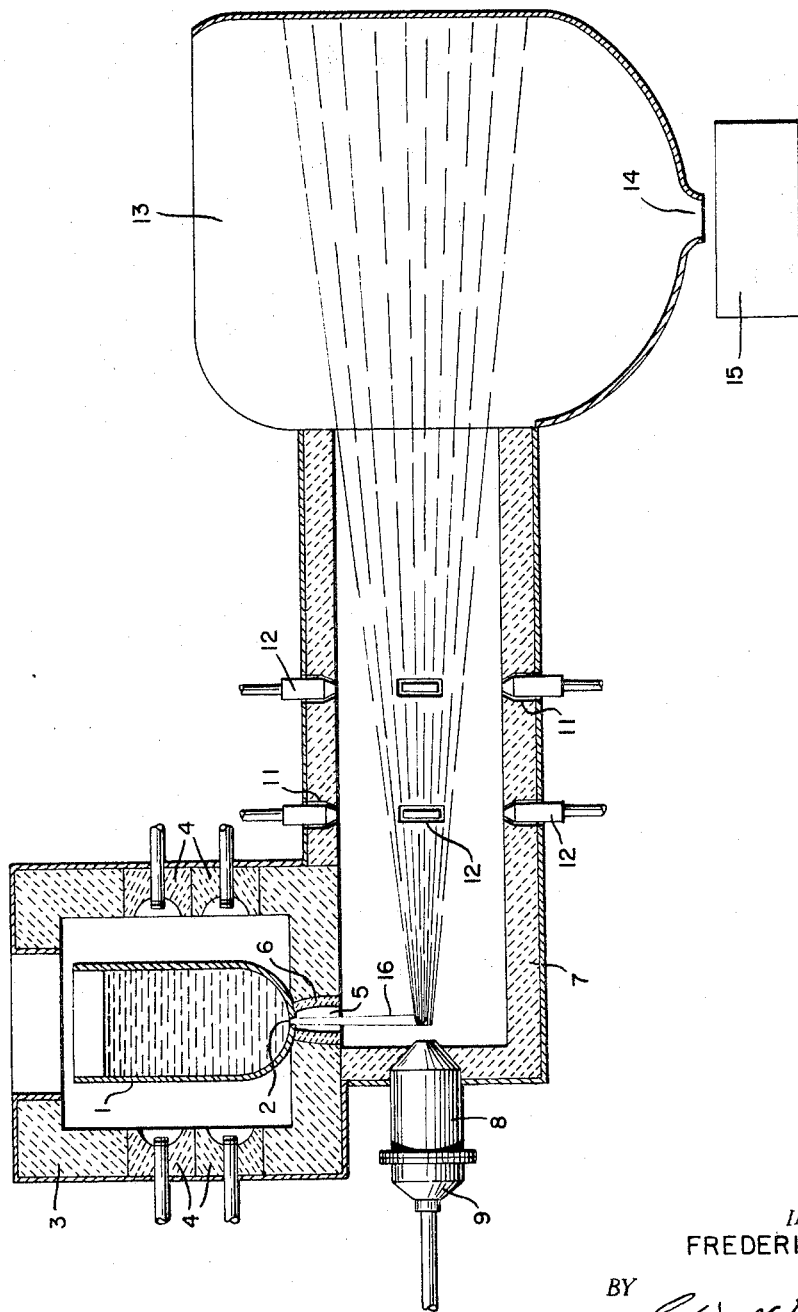
INVENTOR.
FREDERIC O. HESS
BY
ATTORNEY

United States Patent Office 3,294,511
Patented Dec. 27, 1966

3,294,511
APPARATUS FOR FORMING GLASS BEADS
Frederic O. Hess, Philadelphia, Pa., assignor to Selas Corporation of America, Dresha, Pa., a corporation of Pennsylvania
Filed Apr. 6, 1959, Ser. No. 804,466
3 Claims. (Cl. 65—142)

The present invention relates to the manufacture of small glass beads or spheres such as are used in reflecting tape and paint. These beads should be small, uniform in size and clear for the best reflective qualities.

Most glass beads are manufactured by feeding crushed glass into a flame in such a manner that the glass particles are carried along with the combustion gases and products of combustion. While they are traveling, the glass particles are melted, and under the action of surface tension, assume a spherical shape. This procedure requires that glass first be made and then crushed before it can be heated for forming into spheres.

It is an object of the present invention to provide a method and apparatus for making glass spheres or beads directly from molten glass.

In practicing the invention, glass is melted and discharged from an orifice in the melting tank in a small, vertically descending stream. The stream, while still liquid, is struck and disintegrated by a blast of high temperature, high velocity gas directed at an angle to the falling glass. The particles of glass are carried by the blast through a heated zone of an extent that the glass particles have time to be drawn by surface tension into spherical form. The particles are then chilled and collected.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

The single figure of drawing shows the apparatus used in this invention.

Referring to the drawing, there is shown a crucible 1 in which the glass is melted, and from which it is supplied through an orifice 2 in a continuous stream. It is intended that glass forming material such as batch or marbles be added to the crucible from time to time as needed. The crucible is heated in any suitable manner and is shown herein as resting on the floor of a furnace 3 that surrounds it, with the furnace being heated by radiant cup type burners 4. The bottom of the furnace is provided with an opening 5 that is lined with a suitable ceramic sleeve 6. The arrangement is such that crucible 1 rests on the bottom of the furnace in a position with its opening 2 aligned concentrically with sleeve 6 so that the small stream of glass flowing from the crucible will descend through the sleeve.

A chamber 7, that is preferably cylindrical in section and has one end closed, is mounted below and in engagement with the outside of furnace 3. This chamber preferably extends at right angles to the furnace, and it is constructed of suitable insulating refractory material. The closed end of the chamber is provided with an opening 8 which receives the discharge end of a burner 9. Burner 9 is preferably similar to that disclosed in Furczyk Patent 2,561,194 and is characterized by burning within a combustion chamber a combustible mixture of gas and air. The products of combustion are discharged through a restricted port in the end of the chamber as a high temperature, high velocity blast or jet. Ordinarily in the operation of the burners of this type the blast of gases discharged from the burner is at a temperature of approximately 3100° F., and has a velocity of approximately 1,000 feet per second.

Chamber 7 is also provided with a plurality of openings 11 spaced along its length and diametrically with respect to each other, into which openings are placed, the discharge end of burners 12 that are preferably of the type shown in Hess Patent 2,367,119 or Berger Patent 2,427,545. The burners of the Hess and Berger patents are somewhat similar to those shown at 9, but are smaller in capacity and in the velocity of the gases discharged. The gases in this case being discharged at velocity of approximately 500 feet per minute. Suitable gasketing material is inserted between the furnace and chamber 7, and between the openings 8 and 11 in the casing and the burners received therein so that there will be no inflow of cooling air to the chamber.

Beyond the right, or opened end of the chamber, there is provided a metallic collecting hood 13 that has an opening 14 in its bottom, below which is placed a container 15 of some type to receive the glass beads.

In the operation of the apparatus glass batch or glass marbles are placed in crucible 1 and heated by the furnace 3 until the glass is liquid, or, if desired, liquid glass from a large melting furnace can be poured in the crucible.

If a soda-lime type of glass is being used, the crucible will be heated to about 2900° F. which is about 200° F. above the melting point of glass of this type. Therefore, the glass viscosity is low and it will flow readily. The liquid glass will flow vertically downward through opening 2 to form a stream 16 about 1/8 to 3/16 of an inch in diameter and in a position closely adjacent to the discharge port of burner 9. At this point the stream of glass is struck by the high temperature, high velocity blast of products of combustion coming from the burner, and is broken into a multiplicity of small glass particles. These particles of liquid glass are carried to the right in the drawing by the gases from burner 9, and are discharged through the open end of chamber 7.

During the time that the small particles of glass are traveling through the chamber, and while they are still liquid, they will assume a spherical shape due to the action of surface tension. In order to insure that the temperature of the chamber is high enough (about 2300° F.) for the glass to remain sufficiently fluid to be acted upon by surface tension, the burners 12 discharge hot gases into the chamber at spaced points along the chamber. Since these burners are diametrically opposed to each other, the gas discharged from their exit slots will create relatively little turbulence in the chamber so that the flying particles of glass will continue their path without being forced against the side of the chamber. The gases from burners 12 acting at right angles to the flow of glass particles also serve to reduce any tendency for the particles to stick together. By the time the glass particles have left the right end of the chamber, they have assumed a spherical shape and can be collected in hood 13. As the spheres or beads are collected in the hood they will fall to the bottom and through opening 14 into container 15. Immediately after the spheres have left chamber 7 the temperature is reduced enough so that they will freeze. This freezing can be helped by forcing cold air into the hood, or by cooling the sides of the hood with cold water, if it is so desired.

The size of the stream of glass 16, and the velocity of the blast of gases from burner 9, is such that the spheres formed are in the neighborhood of 1/16 of an inch or smaller in diameter. The spheres that are formed are shiny and hard and are suitable for use in reflecting tapes or paints.

From the above it will be seen that I have provided an apparatus and a method by means of which small glass beads or spheres may be formed directly from molten glass without going through the steps of grinding the glass as is customary with present bead forming operations.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. Apparatus for producing glass beads, comprising means for forming a molten glass stream of low viscosity, means in close juxtaposition with the stream forming means for dispersing said stream into a multiplicity of glass particles and directing the same along a path, an elongated substantially enclosed chamber disposed along a portion of said path, said chamber having a side wall and having openings in the ends thereof, said dispersing means being mounted in position to direct the dispersed particles through the chamber, heating means for maintaining the interior of said chamber at an elevated temperature sufficiently high to allow surface tension to shape the particles moving therethrough into spherical form, said particles being directed by said dispersing means from said chamber into a space for a period of time sufficient to cause the setting thereof to form glass beads, and means for collecting said beads.

2. Apparatus for producing glass beads, comprising means for forming a molten glass stream of low viscosity, means in close juxtaposition with the stream forming means for dispersing said stream into a multiplicity of glass particles and directing the same along a path, an elongated substantially enclosed chamber of refractory material disposed along a portion of said path, said chamber having a side wall and having openings in the ends thereof, said dispersing means being mounted in position to direct the dispersed particles through the chamber, means including at least one high-temperature low-velocity burner located on the side wall of said chamber for maintaining the particles moving therethrough at an elevated temperature sufficiently high to allow surface tension to shape the particles into spherical form, said particles being directed by said dispersing means from said chamber into a space for a period of time sufficient to cause the setting thereof to form glass beads, and means for collecting said beads.

3. Apparatus for producing glass beads, comprising means for forming a molten glass stream of low viscosity, means in close juxtaposition with the stream forming means for dispersing said stream into a multiplicity of glass particles and directing the same along a path, an elongated substantially enclosed cylindrical chamber of refractory material disposed along a portion of said path, said chamber having a longitudinally extending cylindrical side wall and having openings in the ends thereof, the longitudinal cross-section of said side wall extending in a direction parallel to said path, said dispersing means being mounted in position to direct the dispersed particles through the chamber, means including a plurality of high-temperature low-velocity burners located on the side wall of said chamber in diametrically opposed relationship with each other for maintaining the particles moving therethrough at an elevated temperature sufficiently high to allow surface tension to shape the particles into spherical form, said particles being directed by said dispersing means from said chamber into a space for a period of time sufficient to cause the setting thereof to form glass beads, and means for collecting said beads.

References Cited by the Examiner

UNITED STATES PATENTS

| 191,524 | 6/1877 | Elbers | 162—152 |
| 2,255,206 | 9/1941 | Duncan | 209—135 |
| 2,616,124 | 11/1952 | Lyle | 65—142 |

FOREIGN PATENTS 495,779  9/1950  Belgium.

DONALL H. SYLVESTER, *Primary Examiner.*

WILLIAM J. STEPHENSON, MICHAEL V. BRINDISI, L. D. RUTLEDGE, G. R. MYERS,
*Assistant Examiners.*